United States Patent [19]
Zulu

[11] Patent Number: 5,545,098
[45] Date of Patent: Aug. 13, 1996

[54] COMPACT STEERING APPARATUS

[75] Inventor: Joshua Zulu, Chillicothe, Ill.

[73] Assignee: Caterpillar Inc., Peoria, Ill.

[21] Appl. No.: 422,367

[22] Filed: Apr. 13, 1995

[51] Int. Cl.⁶ .................................................. F16H 47/04
[52] U.S. Cl. ................................................................ 475/23
[58] Field of Search ........................................ 475/23, 27

[56] References Cited

U.S. PATENT DOCUMENTS

| | | | |
|---|---|---|---|
| 4,434,680 | 3/1984 | Riediger et al. | 74/682 |
| 5,004,060 | 4/1991 | Barbagli et al. | 180/6.44 |
| 5,396,768 | 3/1995 | Zulu | 60/487 |

OTHER PUBLICATIONS

SAE Paper No. 941722, "Development of Hydromechanical Transmission (HMT) for Bulldozers", H. Mitusya et al., Milwaukee, Sep. 12–14, 1994.

*Primary Examiner*—Dirk Wright
*Attorney, Agent, or Firm*—J. W. Burrows

[57] ABSTRACT

A hydro-mechanical steering differential is provided for delivering motive power to right and left output drive members both during straight traveling and during steering. The subject invention includes first and second planetary gear arrangements with a rotatable motor floatingly disposed therebetween. An input member is drivingly connected to both a ring gear of the first planetary gear arrangement and a planet carrier of the second planetary gear arrangement. A sun gear of the first planetary gear arrangement is connected to both the left output drive member and a drive unit of the rotatable motor. A driven unit of the rotatable motor and a sun gear of the second planetary are both connected to the right output drive member. The subject arrangement provides, in a compact design, motive power to the right and left output drive members both while traveling straight and during steering without requiring a separate differential lock.

4 Claims, 1 Drawing Sheet

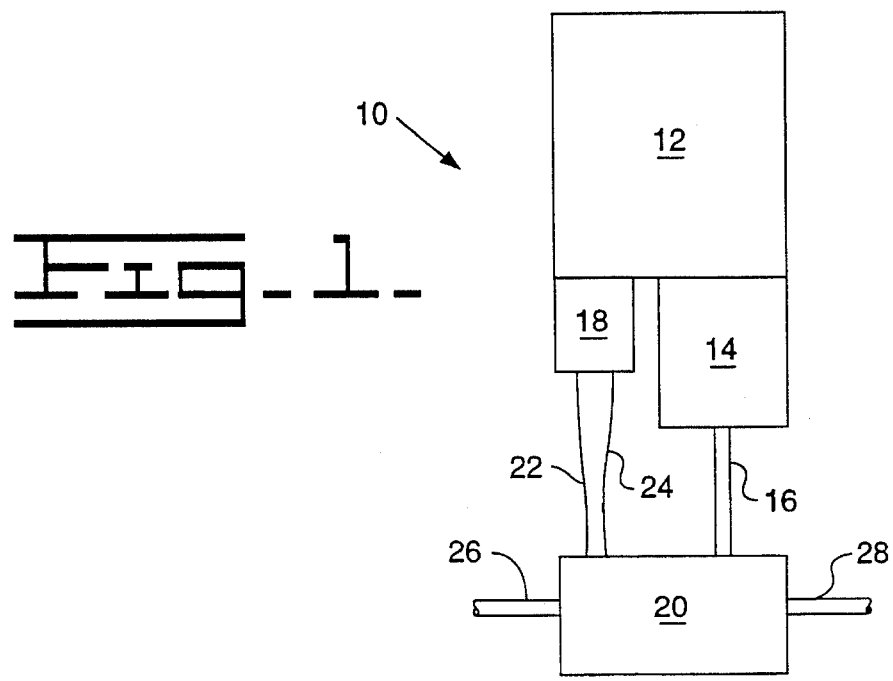
Fig-1-
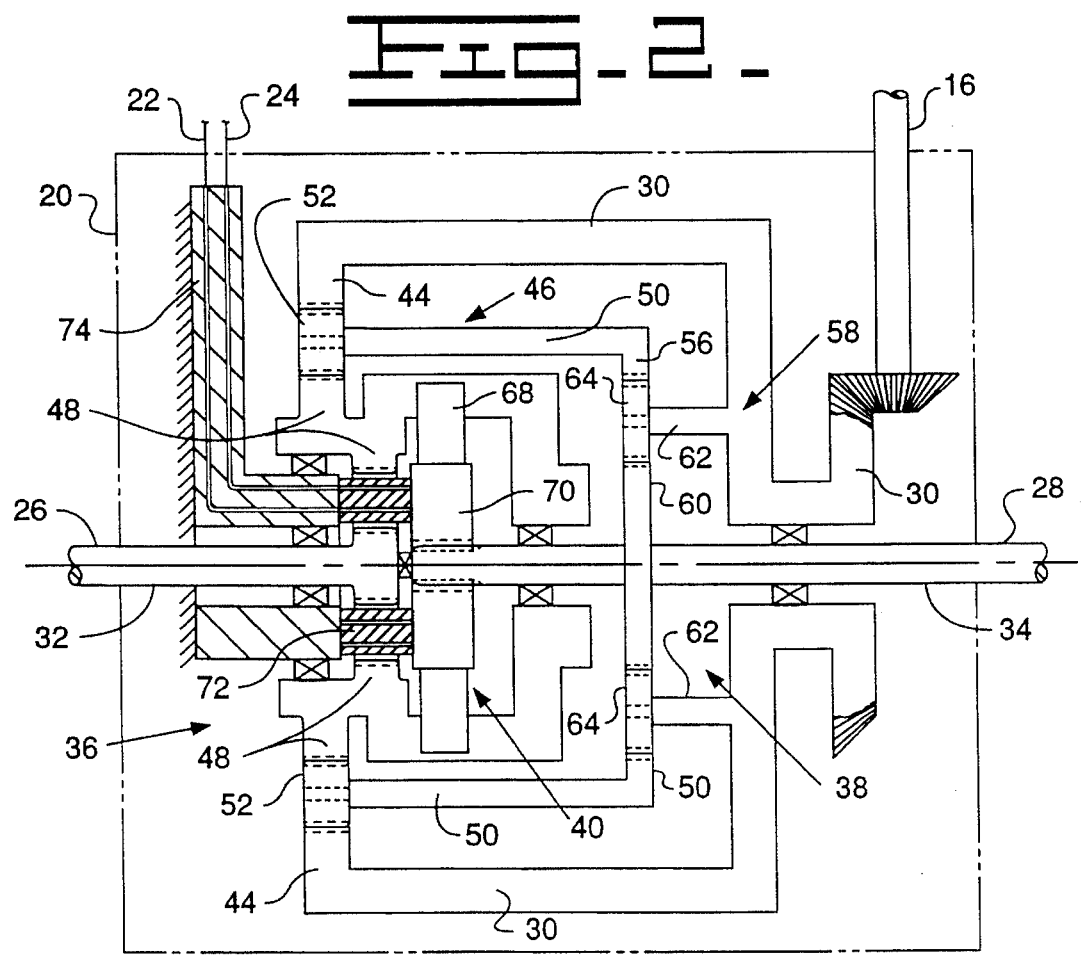
Fig-2-

5,545,098

COMPACT STEERING APPARATUS

TECHNICAL FIELD

This invention relates generally to a steering apparatus and more particularly to a compact steering arrangement having a hydraulic fluid motor disposed relative to a planetary gear arrangement.

BACKGROUND ART

There are many applications in which one or more planetary gear arrangements are used in transmissions and differential steer arrangements. When used in differential steer arrangements, they are normally associated with remotely attached hydraulic pumps and motors and normally require differential locks in order to provide motive power to both outputs at the same time. These arrangements are normally bulky and expensive since there are several different components arranged in one area. It is desirable to have an arrangement that is compact in size while being efficient in use.

The present invention is directed to overcoming one or more of the problems set forth above.

DISCLOSURE OF THE INVENTION

In the present invention, a hydro-mechanical steering differential is provided and adapted for use in a machine having a source of motive power, a transmission operative to direct the motive power through an output shaft to the hydro-mechanical steering differential, a source of pressurized fluid fluidly connected to the hydro-mechanical steering differential, and right and left output drive members operatively connected to the hydro-mechanical steering differential. The hydro-mechanical steering differential includes an input member adapted for connection to the transmission output shaft, first and second output members adapted for integral connection with the respective right and left output drive members, a first planetary gear arrangement connected between the input member and the first output member, a second planetary gear arrangement connected between the input member and the second output member, and a rotatable fluid motor floatingly disposed between the first and second planetary gear arrangements and adapted for fluid connection with the source of pressurized fluid.

BRIEF DESCRIPTION OF THE DRAWINGS

FIG. 1 is a diagrammatic representation of the motive power components of a machine including an embodiment of the present invention: and FIG. 2 is a more detailed diagrammatic representation of the subject invention.

BEST MODE FOR CARRYING OUT THE INVENTION

Referring to FIG. 1, a motive power portion 10 of a machine (not shown) is illustrated. The motive power portion 10 includes a source of motive power, such as an engine 12, a transmission 14 having and output shaft 16, a source of pressurized fluid, such as a pump 18, a hydro-mechanical steering differential 20 drivingly connected to the transmission output shaft 16 and fluidly connected by conduits 22, 24 to the pump 18, and right and left output drive members 26, 28.

Referring to FIG. 2, the hydro-mechanical steering differential 20 includes an input member 30 drivingly connected to the transmission output shaft 16, first and second output members 32, 34 directly connected to the respective right and left output drive members 26, 28 first and second planetary gear arrangements 36, 38, and a rotatable fluid motor 40 fluidly connected to the pump 18 by the conduits 22, 24.

The first planetary gear arrangement 36 includes a ring gear 44 integrally connected with the input member 30, a planet gear assembly 46 drivingly associated with the ring gear 44, and a sun gear 48 drivingly associated with the planet gear assembly 46 and connected to the first output member 32. The planet gear assembly 46 includes a planet carrier 50 and a set of planet gears 52.

The second planetary gear arrangement 38 includes a ring gear 56 integrally connected to the planet carrier 50 of the first planetary gear arrangement 36, a planet gear assembly 58 drivingly associated with the ring gear 56 and integrally connected to the input member 30, and a sun gear 60 drivingly associated with the planet gear assembly 58 and integrally connected to the second output member 34. The planet gear assembly 58 includes a planet carrier 62 and a set of planet gears 64.

The rotatable fluid motor 40 includes a drive unit 68 and a driven unit 70. The drive unit 68 is drivingly connected with the sun gear 48 of the first planetary gear arrangement 36 and the driven unit 70 is connected to the second output member 34. The rotatable motor 40 is connected with the conduits 22, 24 by a distributor valve 72 that is rotatably disposed relative to the sun gear 48 and the first output member 32 and located between a stationary member 74 containing the conduits 22, 24 and the rotatable motor 40. For additional details relative to the operation of the rotatable motor 40 and the distributor valve 72, please refer to U.S. Pat. No. 5,396,768 issued Mar. 14, 1995.

INDUSTRIAL APPLICABILITY

In the operation of the hydro-mechanical steering differential described with respect to FIGS. 1 and 2, the operator selects a speed and direction by making an input to the transmission 14. The motive power from the engine 12 is delivered through the transmission output shaft 16 to the input member 30 of the hydro-mechanical steering differential 20. With the rotatable motor 40 receiving no fluid flow from the pump 18, the drive unit 68 and the driven unit 70 of the rotatable motor 40 are blocked from relative rotation with each other. Consequently, the power being directed through the input member 30 is equally and evenly directed through the first and second planetary gear arrangements 36, 38 to the respective right and left output drive members 26, 28 through the respective first and second output members 32, 34. As long as the machine is traveling in a straight direction, both output drive members 26, 28 are receiving equal power and rotating at the same speed.

If it is desired to steer the machine in one direction without changing the transmission speed, the operator makes an input to direct pressurized fluid from the pump 18 through one of the conduits 22, 24 to the rotatable motor 40. The return flow from the rotatable motor 40 returns to the pump 18 through the other of the conduits 22, 24. The pressurized fluid causes the drive unit 68 of the rotatable motor 40 to rotate relative to the driven unit 70. The relative rotation between the drive unit 68 and the driven unit 70 results in one of the first and second output members 32, 34 increasing in rotational speed and the other of the first and second output members 32, 34 decreasing in rotational speed. Even though the rotational speeds of the first and second output members 32, 34 are changing speeds both of them are still receiving motive power from the engine 12. The degree of steer is determined by the magnitude of pressurized fluid being directed from the pump 18 to the rotatable motor 40. The relative speed between the driven unit 68 and the drive unit 70 can be increased to a level at which the rotational speed of one of the first and second output members 32, 34 is at zero speed, normally referred to as pivot turn. Likewise, the relative speeds can be further increased to a level at which the one output member 32/34 rotates in a direction opposite to the rotational direction of the other output member 32/34. When both of the first and second output members 32, 34 are rotating at the same speed but in opposite directions, the machine is making a steer normally referred to as a spot turn.

If it desired to steer the machine in the opposite direction, the operator makes an input to direct pressurized fluid from the pump 18 to the rotatable motor 40 through the other of the conduits 22, 24. The driven unit 68 now rotates relative to the driven unit 70 in a direction opposite to that set forth above. In this situation, the relative rotation of the first and second output members 32, 34 is just the opposite. The other of the first and second output members 32, 34 increases in rotational speed while the one output member 32/34 decreases in speed. The degree of steer is controlled by the operator as described above.

From a review of the above, it should be recognized that when the machine is traveling in the opposite direction, the machine is steered the same as described above.

In view of the foregoing, the subject invention provides a compact steering arrangement that always has power to the respective right and left output drive members 26, 28 during both traveling straight and while steering. Likewise, the subject arrangement is compact and does not require differential locks or other remotely located apparatus.

I claim:

1. A hydro-mechanical steering differential adapted for use in a machine having a source of motive power, a transmission operative to direct the motive power through an output shaft to the hydro-mechanical steering differential, a source of pressurized fluid fluidly connected to the hydro-mechanical steering differential, and right and left output drive members operatively connected to the hydro-mechanical steering differential, the hydro-mechanical steering differential comprising:

an input member adapted for connection to the transmission output shaft, first and second output members adapted for integral connection with the respective first and second output drive members, a first planetary gear arrangement connected between the input member and the first output member, a second planetary gear arrangement connected between the input member and the second output member, and a rotatable fluid motor floatingly disposed between the first and second planetary gear arrangements and adapted for fluid connection to the source of pressurized fluid, each of the first and second planetary gear arrangements has a ring gear, a planet gear assembly and a sun gear, each of the planet gear assemblies has a planet carrier and a set of planet gears, the input member being integrally connected with both the ring gear of the first planetary gear arrangement and the planet carrier of the second planetary gear arrangement.

2. The hydro-mechanical steering differential of claim 1 wherein the planet carrier of the first planetary gear arrangement is integrally connected with the ring gear of the second planetary gear arrangement and the sun gear of the second planetary gear arrangement is connected to the second output member.

3. The hydro-mechanical steering differential of claim 2 wherein the rotatable fluid motor includes a drive unit and a driven unit and the sun gear of the first planetary gear arrangement is connected with both the first output member and the drive unit of the rotatable motor.

4. The hydro-mechanical steering differential of claim 3 wherein the driven unit of the rotatable motor is connected to the second output member.

\* \* \* \* \*